(12) United States Patent
Uchida et al.

(10) Patent No.: US 7,599,864 B2
(45) Date of Patent: *Oct. 6, 2009

(54) SYSTEM AND METHOD FOR TRANSMITTING INFORMATION REGARDING SUPPLIES AND SUPPLIERS FOR IMAGE FORMING EQUIPMENT

(75) Inventors: Yuki Uchida, Wayne, NJ (US); Toshihiro Kudara, River Edge, NJ (US); Hisashi Ishijima, Fort Lee, NJ (US)

(73) Assignees: Ricoh Company, Ltd., Tokyo (JP); Ricoh Corporation, West Caldwell, NJ (US)

( * ) Notice: Subject to any disclaimer, the term of this patent is extended or adjusted under 35 U.S.C. 154(b) by 20 days.

This patent is subject to a terminal disclaimer.

(21) Appl. No.: 11/701,739

(22) Filed: Feb. 2, 2007

(65) Prior Publication Data

US 2007/0136145 A1  Jun. 14, 2007

Related U.S. Application Data

(63) Continuation of application No. 09/710,329, filed on Nov. 9, 2000, now Pat. No. 7,321,867.

(51) Int. Cl.
  *G06Q 30/00* (2006.01)
(52) U.S. Cl. ........................................ 705/26
(58) Field of Classification Search ............. 705/26, 705/27
  See application file for complete search history.

(56) References Cited

U.S. PATENT DOCUMENTS

| | | | |
|---|---|---|---|
| 4,992,940 A | 2/1991 | Dworkin | |
| 5,335,048 A | 8/1994 | Takano et al. | |
| 5,361,199 A | 11/1994 | Shoquist et al. | |
| 5,564,110 A | 10/1996 | Ueda | |
| 5,594,529 A | 1/1997 | Yamashita et al. | |

(Continued)

FOREIGN PATENT DOCUMENTS

EP     0715221     6/1996

(Continued)

OTHER PUBLICATIONS

Dialog File 20, "Staples streamlines buying office supplies online", BusinessWire, Nov. 17, 1998.*

(Continued)

*Primary Examiner*—Mark Fadok
(74) *Attorney, Agent, or Firm*—Cooper & Dunham, LLP

(57) ABSTRACT

A method and a system to help users of image forming equipment make informed decision on when to order supplied therefor and from which supplier. The equipment at the user side automatically sends status information to a service center that keeps a database of independent suppliers. The service center analyzes the automatically transmitted information from the user side and when it detects a need for supplies for specific equipment of a specific user, it analyzes a database of independent potential suppliers to generate a list of suppliers matching the particular detected need. The service center sends the list and information about the suppliers and supplies on the list to the user side, from which the supplies are ordered from one or more suppliers and delivered thereby to the user side.

15 Claims, 12 Drawing Sheets

U.S. PATENT DOCUMENTS

| | | |
|---|---|---|
| 5,664,110 A | 9/1997 | Green et al. |
| 5,758,328 A | 5/1998 | Giovannoli |
| 5,835,817 A | 11/1998 | Bullock et al. |
| 5,842,178 A | 11/1998 | Giovannoli |
| 6,003,078 A | 12/1999 | Kodimer et al. |
| 6,023,593 A | 2/2000 | Tomidokoro |
| 6,065,824 A | 5/2000 | Bullock et al. |
| 6,119,101 A | 9/2000 | Peckover |
| 6,134,557 A | 10/2000 | Freeman |
| 6,141,507 A | 10/2000 | Sawada |
| 6,233,409 B1 | 5/2001 | Haines et al. |
| 6,264,301 B1 | 7/2001 | Helterline et al. |
| 6,271,928 B1 | 8/2001 | Bullock et al. |
| 6,293,144 B1 | 9/2001 | Froger et al. |
| 6,295,423 B1 | 9/2001 | Haines et al. |
| 6,302,527 B1 | 10/2001 | Walker |
| 6,312,106 B1 | 11/2001 | Walker |
| 6,333,790 B1 | 12/2001 | Kageyama |
| 6,405,178 B1 * | 6/2002 | Manchala et al. ............. 705/29 |
| 6,529,692 B1 | 3/2003 | Haines et al. |
| 6,714,744 B2 | 3/2004 | Arima |
| 6,985,877 B1 * | 1/2006 | Hayward et al. ............. 705/27 |
| 7,526,438 B1 * | 4/2009 | Harper et al. ................. 705/26 |
| 2002/0042747 A1 | 4/2002 | Istvan |
| 2005/0065859 A1 | 3/2005 | Uchida et al. |

FOREIGN PATENT DOCUMENTS

| | | |
|---|---|---|
| EP | 0810483 A1 | 12/1997 |
| JP | 3-122997 | 5/1991 |
| JP | 3-226767 | 10/1991 |
| JP | 3-226768 | 10/1991 |
| JP | 8-152816 | 6/1996 |
| JP | 8-152817 | 6/1996 |
| JP | 8-152824 | 6/1996 |
| JP | 8-152825 | 6/1996 |
| JP | 8152816 | 6/1996 |
| JP | 8152817 | 6/1996 |
| JP | 9-321931 | 12/1997 |
| JP | 11-3005 | 1/1999 |
| JP | 11-136378 | 5/1999 |
| JP | 11-143932 | 5/1999 |
| JP | 2001-246822 | 9/2001 |
| JP | 2001-297237 | 10/2001 |

OTHER PUBLICATIONS

U.S. Appl. No. 09/710,329, filed Nov. 9, 2000.

Apr. 14, 2008 European official action in connection with corresponding European application No. 01 125 477.

* cited by examiner

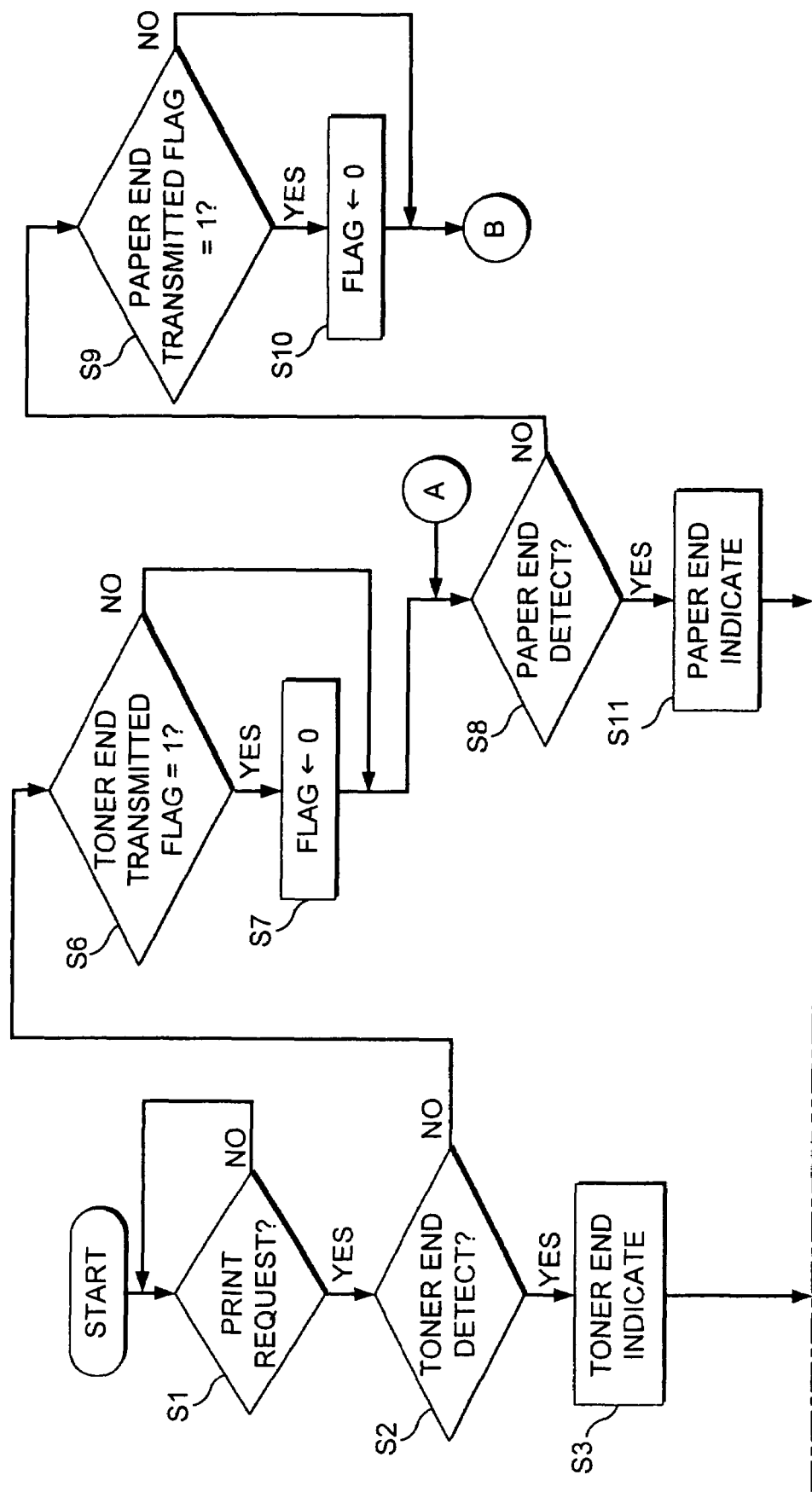
FIG. 5a1

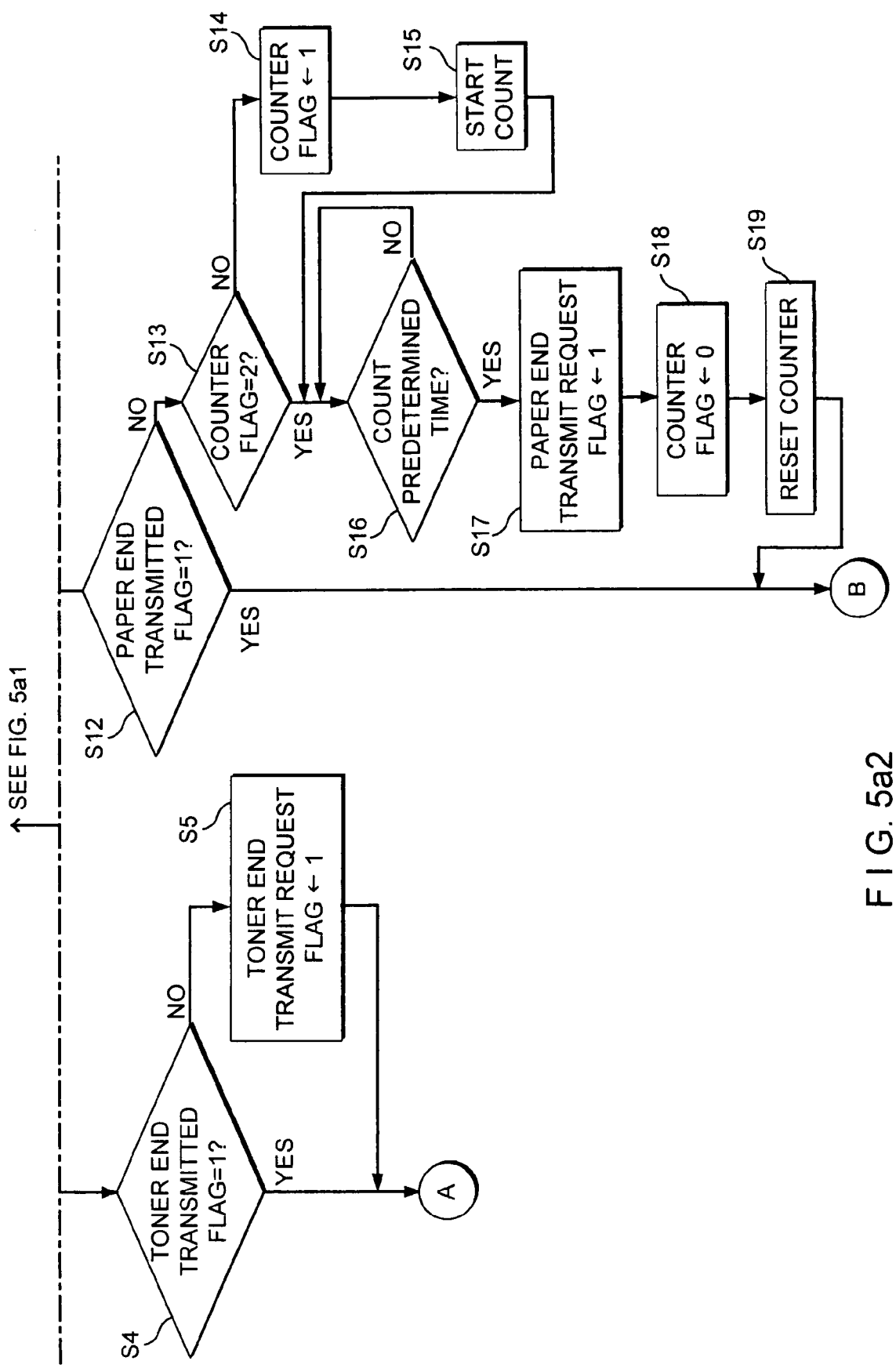
FIG. 5a2

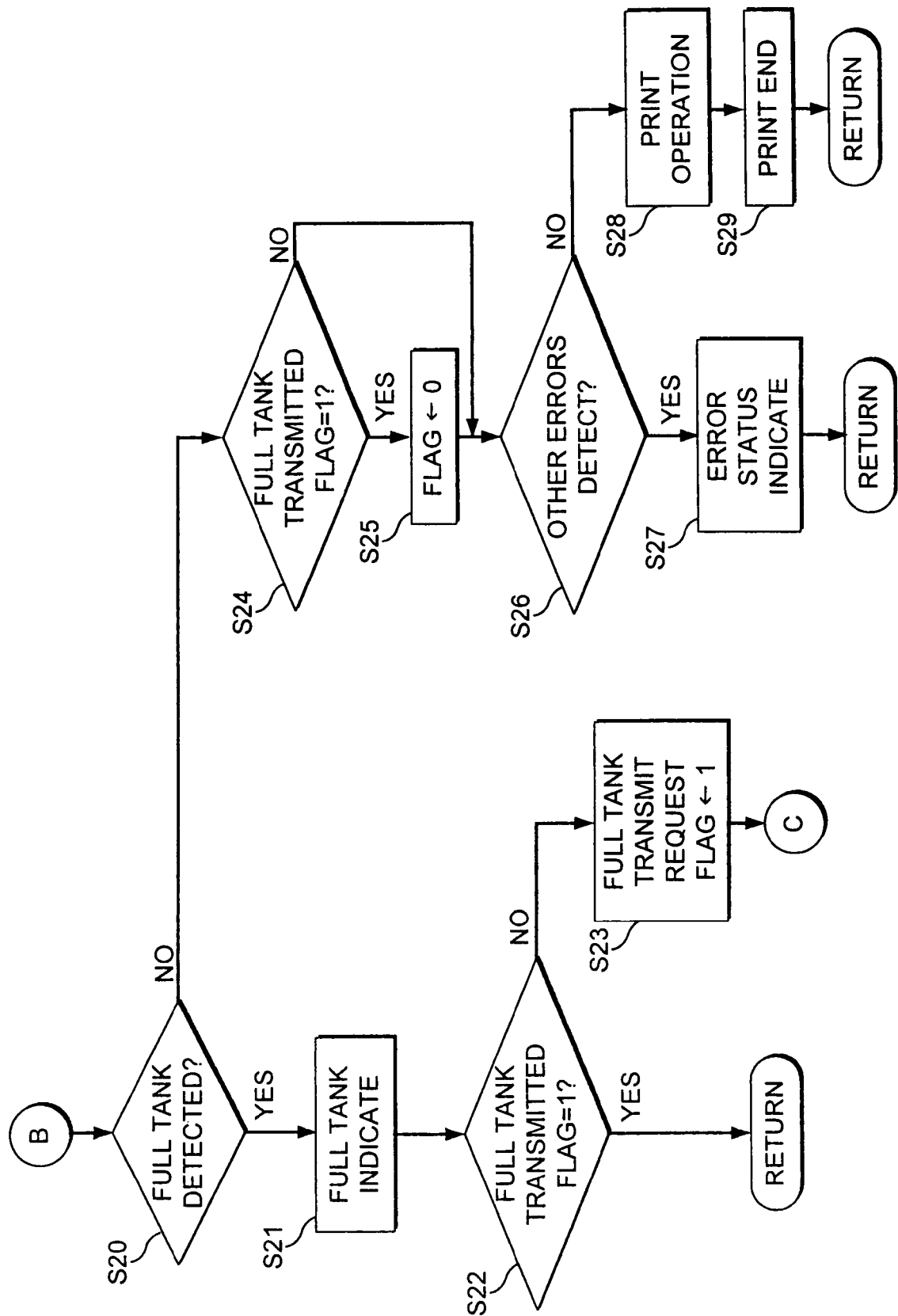
FIG. 5a3

FIG. 7

| RETAILER/ DEALER NAME | TEL | ADDRESS | SUPPLIES | | PRICE | QUANTITY | |
|---|---|---|---|---|---|---|---|
| ABC | 973-123-1234 | 5 DEDRICK NJ | MX 0001 | 1 TONER CARTRIDGE | $70.00 | ☐ | SELECT |
| DEF | 201-123-1234 | 1234 Sst NJ | NX 0001 | TONER CARTRIDGE | $75.00 | ☐ | SELECT |
| GHI | 212-123-1234 | 567 Mst NY | NX 0001 | TONER CARTRIDGE | $72.00 | ☐ | SELECT |
| ... | | | | | | | |

⇨

| SELECTED | TEL# | ADDRESS | SUPPLIES MODEL | PRICE |
|---|---|---|---|---|
| ABC | 973-123-1234 | 5 DEDRICK NJ | MX 0001 | $74.20 ($70.00 + $4.20 TAX) |

[ORDER]  [CANCEL]

⇨

YOUR ORDER #  123 456 789

| ABC | 973-123-1234 | 5 DEDRICK NJ | MX 0001 | $74.20 |
|---|---|---|---|---|

[CLOSE]

SYSTEM AND METHOD FOR TRANSMITTING INFORMATION REGARDING SUPPLIES AND SUPPLIERS FOR IMAGE FORMING EQUIPMENT

CROSS-REFERENCE TO RELATED APPLICATIONS

This application is a Rule 1.53(b) Continuation of U.S. Ser. No. 09/710,329, filed Nov. 9, 2000, now U.S. Pat. No. 7,321,867, the entire contents of which are incorporated by reference herein. This application is also related to U.S. application Ser. No. 10/967,624 filed Oct. 18, 2004 which is a divisional of Ser. No. 09/710,329.

FIELD

This patent specification relates to a system and method for assisting users of image forming equipment such as copiers, printers, fax machines to acquire and replenish supplies such as toner, paper, etc.

BACKGROUND

Image forming equipment typically uses supplies such as toner, ink, paper and others. They are often called consumables in the trade, as they get used up and need to be replenished from time to time in regular use of the equipment. Copiers, printers, and fax machines are some examples of such image forming equipment. One type use toner cartridges each including a photoconductive drum, a developing device to form a toner image, a cleaning device to remove residual toner from the drum, and other components, and typically print on cut sheets of paper. Other types use toner bottles or other printing methods, such as line printing and ink-jet printing.

A user who needs to replace or add supplies may purchase them as needed or may take them from an inventory the user maintains, for which purchases from suppliers are made less frequently. For greater convenience, remote diagnostic systems are offered to connect equipment such as copiers to a service center via the public switched telephone network in order to automatically transmit status information about the image forming devices to the service center. Japanese Laid-Open Publications 8-152816 and 8-152817 discuss such systems. According to the publications, usage information regarding toner and paper for copiers is transmitted to the service center, and the service center manages an inventory of supplies at the user side based on the transmitted information. When the inventory gets depleted, the service center plans replenishment. In the publications, as understood, the entity that would send supplies to the user side is predetermined, and the system does not provide the user with information about other possible sources of relevant supplies.

In the conventional approaches discussed above, the system that keeps track of the need to replenish supplies at the user side does not help the user locate and contact other sources of the relevant supplies, which may meet the user's need better because they are closer, or offer better prices, or in some other way are more attractive to a user.

BRIEF SUMMARY

In an aspect of this disclosure, a system and a method are provided wherein users are provided not only with information regarding when they should replenish supplies but also with a choice of recommended options, preferably selected for suitability to individual users and preferably together with information, such as pricing, to help users make informed choices.

In one non-limiting example, the system keeps checking equipment at a user side to determine if certain status conditions have occurred. In the case of a copier, the system can keep checking to see if toner has been depleted, if the copier has been out of certain size paper for more than a specified time period, if a tank for used toner has filled up, etc. Respective status signals are sent to a service center over communication links. Upon detecting a condition that calls for replenishing supplies at a user side, the service center interrogates a database of information regarding dealers/retailers to find among them businesses that can best satisfy the user's current need based on factors such as the relative locations of the user and the dealer/retailer, whether the potential supplier has in stock the particular supplies the user needs at the moment, etc. The service center then provides the user with a choice of potential suppliers matching the user's current needs, together with information regarding those potential suppliers such as prices, locations, etc. As a result, the user can make an informed choice on which supplier to select, based on the supplied information and also based on the user's current needs, desires and constraints. A specific implementation of an example is disclosed in detail below.

BRIEF DESCRIPTION OF THE DRAWING

FIGS. 5a and 5b are flow charts illustrating steps of a process constituting a preferred embodiment.

FIG. 7 illustrates information displays involved in communications between a user and a service center.

DETAILED DESCRIPTION OF PREFERRED EMBODIMENTS

Figure 1:
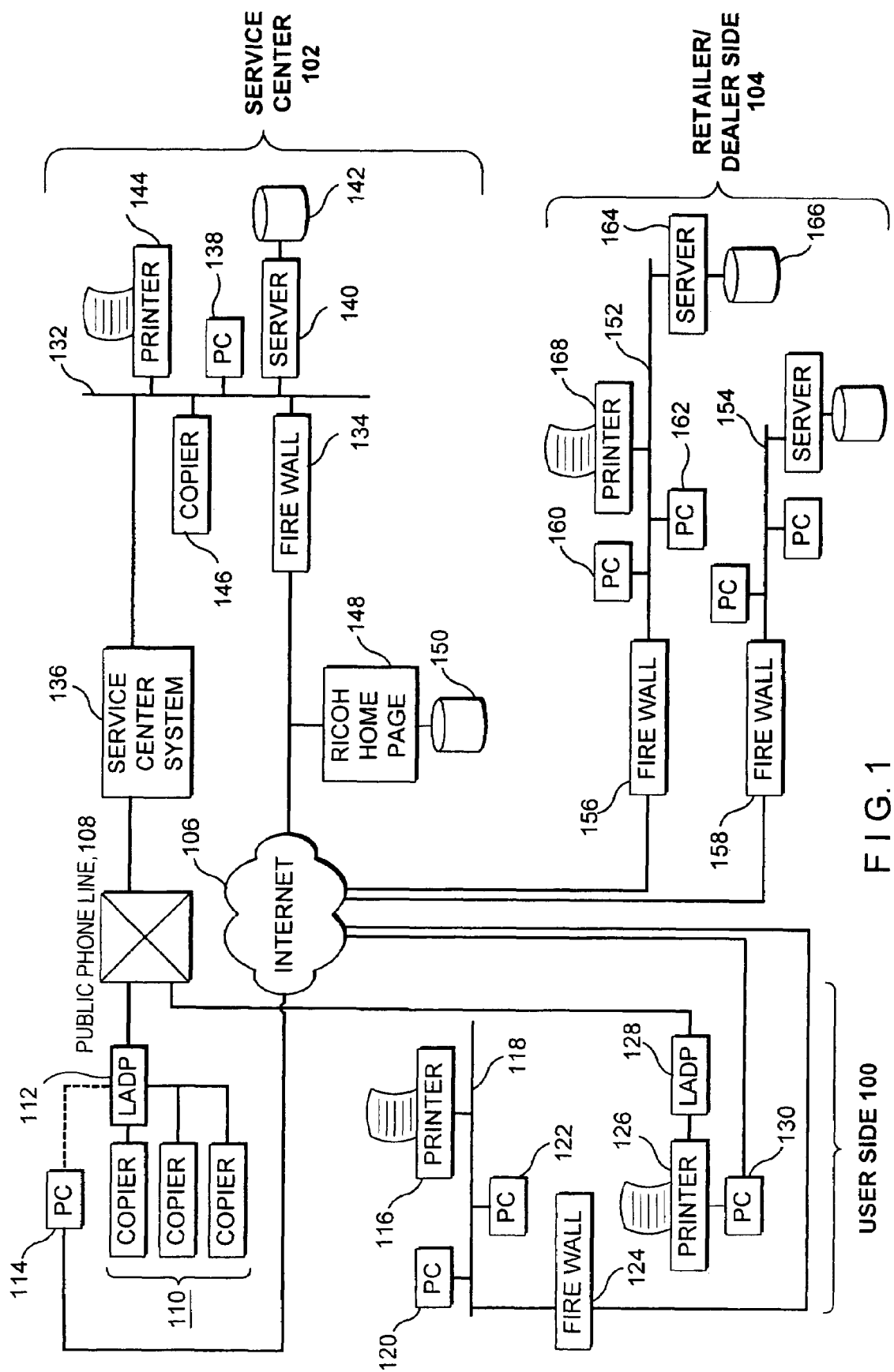
FIG. 1 illustrates in schematic form an embodiment in which a user side, a service center and retailers/dealers communicate through links such as the Internet and the public telephone network.

Referring to FIG. 1, three groups of entities are interconnected through communication links such as the Internet, the public telephone switched network, or some other link. They are a user side 100, a service center 102, and a retailer/dealer side 104, communicating through Internet 106 and telephone lines 108. As an overview, service center 102 automatically receives information from user side 100 regarding usage of supplies, and also receives information from retailer/dealer side 104 regarding suppliers and availability of supplies. Service center 102 analyzes such information and, as and when needed, supplies information to user side 100 that facilitates replenishment of supplies in a particularly effective way. In doing its analysis, service center 102 uses information collected in its database, and selects suppliers that are particularly appropriate to a user, given the user's location, equipment and current need for supplies. Typically, contractual arrangement exist between service center 102 and dealers/retailers as side 104. Contractual arrangements can also exist between users at side 100 and service center 102.

User side 100 can include a number of image forming devices and other equipment communicating through Internet 106 and/or telephone link 108. For example, user side 100 can include one or more copiers 110 communicating with telephone line 108 through a line adaptor 112 and a personal computer 114 communicating with copiers 110 and Internet 106. User side 100 can further include printers such as 116 on a local area network 118 to which other devices can be attached, such as personal computers 120 and 122, and which communicates with Internet 106 through a firewall 124. User side 100 can still further include other image forming devices, such as a printer 126 communicating with phone line 108 through a line adaptor 128 and with a personal computer 130 that in turn communicates with Internet 106.

Service center 102 can include a local area network communicating with Internet 106 through a firewall 136 and servicing a number of devices, such as a service center computer system 136, a personal computer 138, a server 140 with a database storage 142, and peripheral devices such as a printer 144 and a copier 146. In addition, a home page server 148 and its database storage 150 can be provided at central service center 102, communicating with Internet 106 directly, as illustrated, or through firewall 134.

Retailer/dealer side 104 typically comprises a number of local area networks such as 152 and 154 communicating with Internet 106 through respective firewalls 156 and 158. Respective networks such as 152 and 154 are located at businesses that can provide supplies to users having image forming devices. Typically, many more suppliers are similarly connected in this system. As illustrated in the case of LAN 152, a typical installation at such a business has a number of devices attached to the local area network, including personal computers 160 and 162, a server 164 with database storage 166, and a printer 168. Network 154 can be similarly organized.

Figure 2:
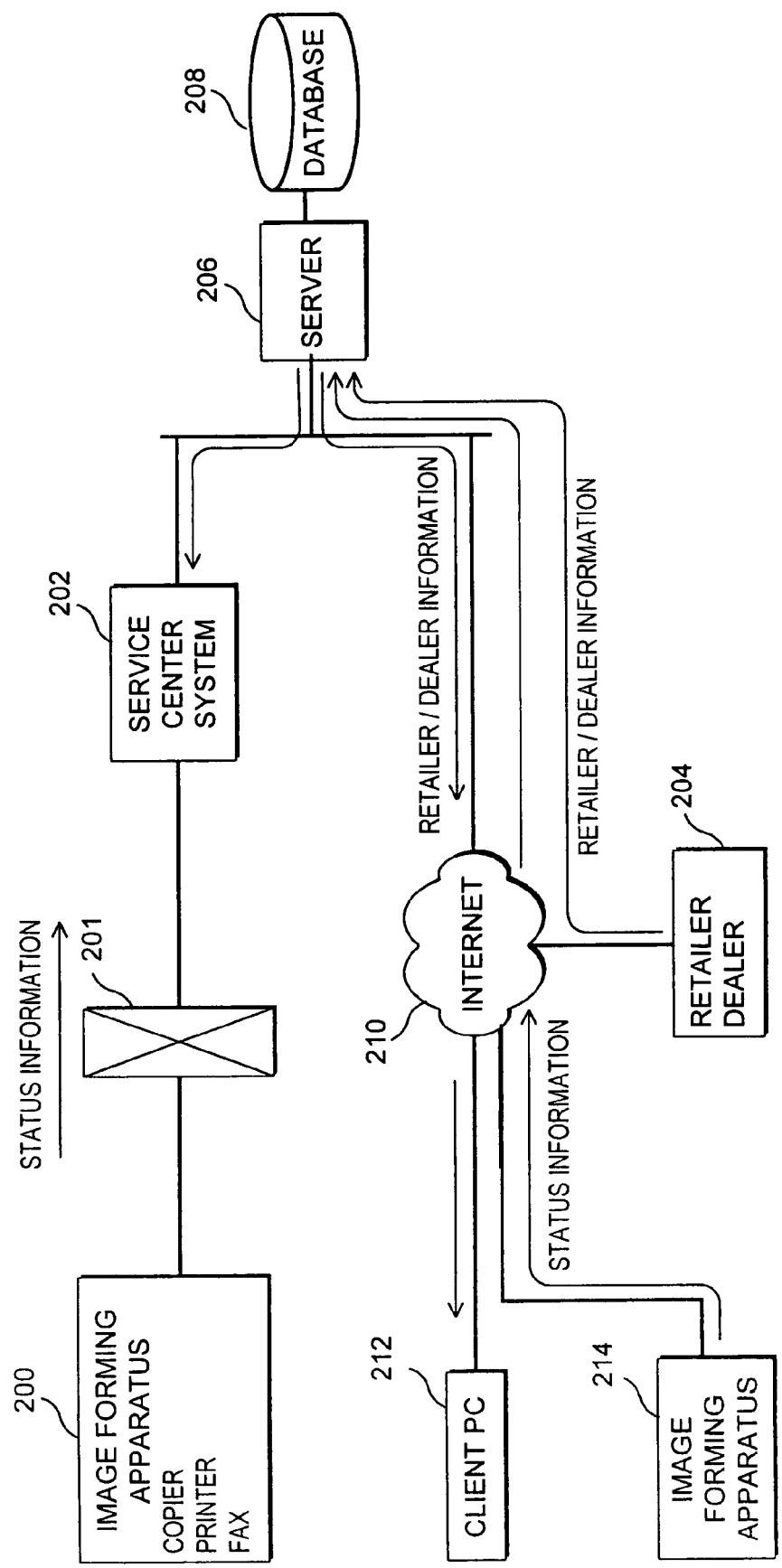
FIG. 2 illustrates in simplified form one example of flow of information in the system of FIG. 1.

FIG. 2 illustrates in simplified form an example of information flow in the system of FIG. 1. An image forming apparatus 200, which can be one of devices such as copiers 110 in FIG. 1, sends status information through a link 201 to service center system 202 that can be the same or similar to system 136 in FIG. 1. The status information can include information on usage of supplies by device 200, such as usage of toner, paper and/or other consumables, user contact information such as a user's e-mail address, and/or other information such as the model number of image forming apparatus 200. A retailer/dealer 204, which can be one of the entities as side 104 in FIG. 1, transmits retailer/dealer information that can include an identification of the retailer/dealer and its service capabilities, such as name, address, phone number, fax number, Home Page URL, territory, kinds of supplies available, such as toner, paper, toner cartridges, and so on that the retailer/dealer handles and/or has in stock, model numbers and/or names of available supplies, and model numbers and/or names of image forming equipment that can use such supplies. This information is stored in server 206 and its database 208 that communicate with retailer/dealer 204 and service center system 202 as illustrated, through a telephone line and of the Internet. Service center system 202 receives status information regarding image forming apparatus 200 and analyzes the information to select appropriate retailer/dealer information that matches the user's needs or desires, using database 208. The selected information is automatically transmitted to the e-mail address that is in the status information received from the user, of is otherwise made available to the user. The user can then select a retailer or dealer among the retailers or dealers included in the information supplied thereto from service center system 202. A similar flow of information is provided through Internet connection 210 for another user having a personal computer 212 and an image forming apparatus 214.

Figure 3:
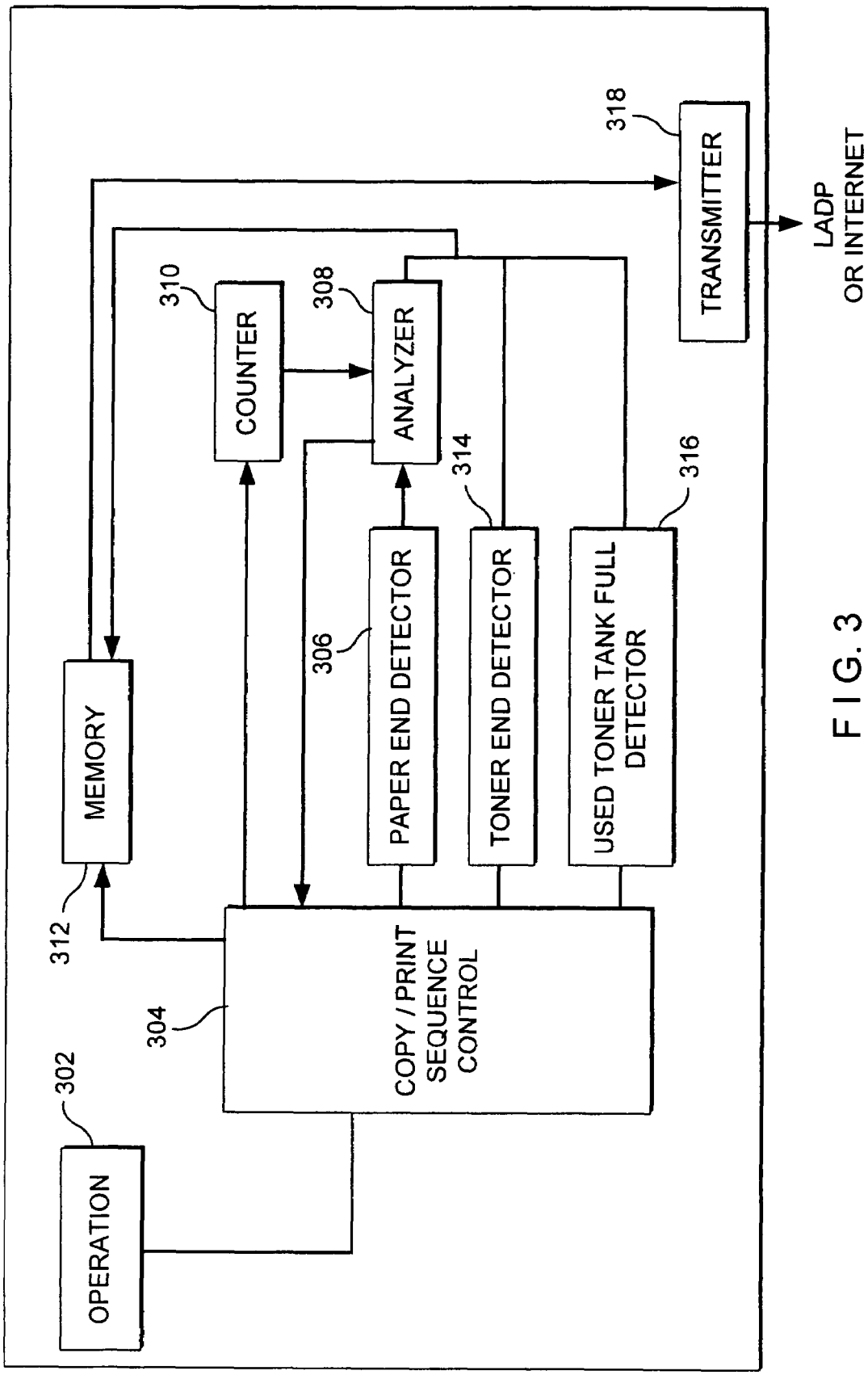
FIG. 3 illustrates a control unit for an image forming apparatus.

FIG. 3 illustrates schematically a control unit 300 of an image forming apparatus such as one of the copiers 110 in FIG. 1. Control unit 300 comprises an operation unit 302 that can include a display panel providing status indications in an image forming device such as a copier and manually operable keys (soft or hard keys) for the input of data by an operator, as well as associated circuiting to provide the functions described below. A copy/print sequence control 304 controls the image forming sequence of the image forming apparatus. When a start key is pressed in the case of a copier or a print request is sent from a personal computer in the case of a printer, control 304 appropriately controls various sections, as further described in FIG. 5. FIG. 3 illustrates a paper end detector 306 that detects the end of, or the lack of paper for each size in the image forming apparatus and sends a paper end signal to an analyzer 308. A counter 310 sends a count signal to analyzer 308. Analyzer 308 checks whether the paper end status has continued for a predetermined count and, if it has, stores a paper end status a memory 312. A toner end detector 314 detects the depletion of toner in a toner bottle or toner cartridge that includes at least one of a photoconductive drum, a developing device and a cleaning device. If a toner end condition is detected thereby, it also is stored in memory 312. A used toner tank full detector 316 detects when a tank for used toner is full and, in response, stores a corresponding signal in memory 312. The conditions stored in memory 312 are sent to a transmitter 318, which transmits these conditions to service center system 136 (202) through a line adapter and the public phone line or through the Internet as earlier discussed.

Figure 4:
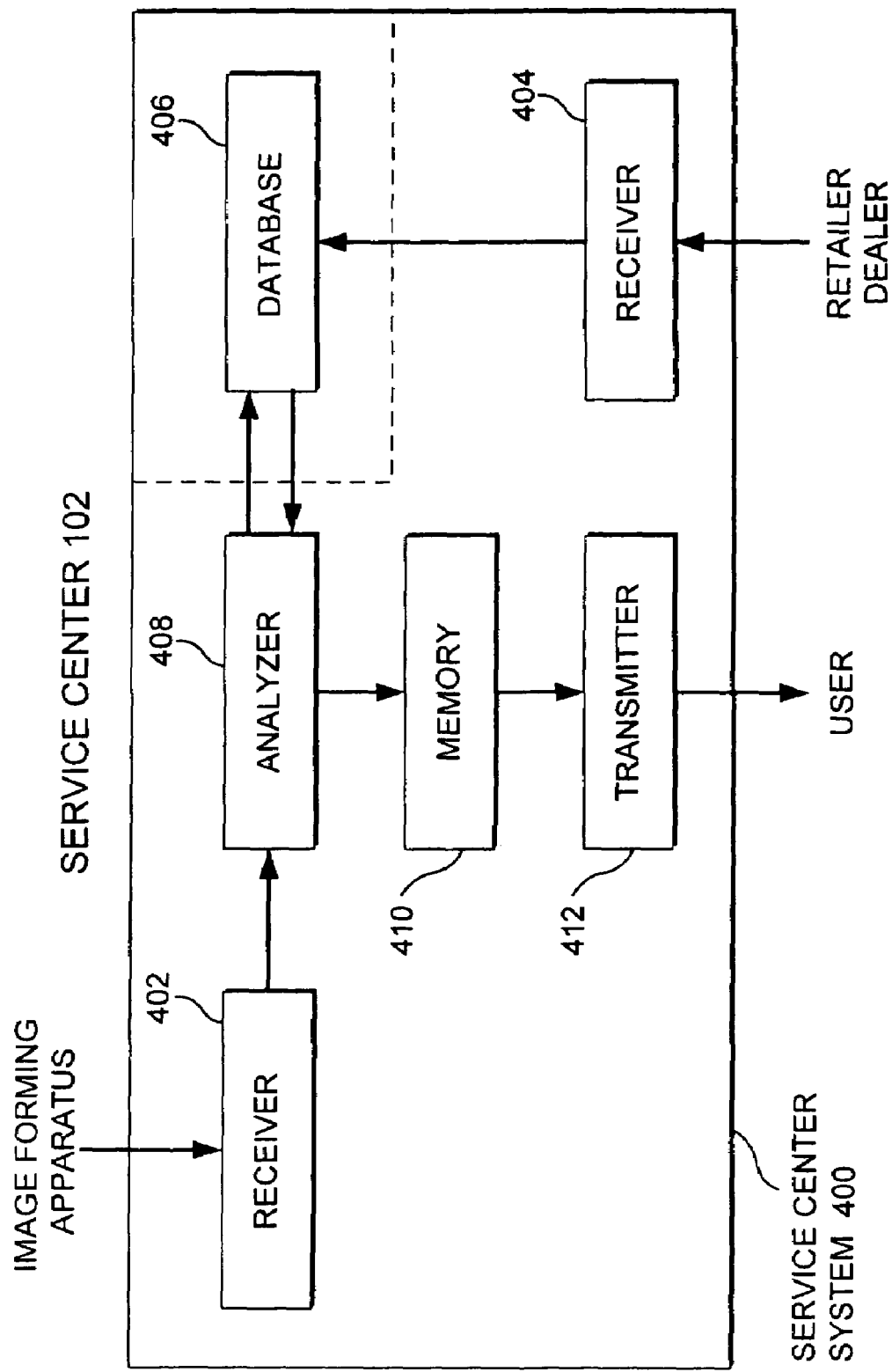
FIG. 4 illustrates a control unit of a service center.

FIG. 4 illustrates a control unit of service center 102. Service center system 400 can be similar to or the same as elements 136 and 202 earlier discussed and includes a receiver 402 that receives the status information transmitted from an image forming apparatus such as a copier 110. The retailer/dealer information that is transmitted from a retailer/dealer such as at retailer/dealer side 104 is received through another receiver 404 and is stored in a database 416 that can be the same as or similar to database 142. An analyzer 408 receives the status information and interrogates database 406 to find appropriate retailers or dealers based on the received status information. The found or selected information relating to the retailers or the dealers is stored in a memory 410 and is transmitted via a transmitter 412 to the e-mail address that is in the status information received at receiver 402, or is otherwise transmitted to the user.

Figure 5B:
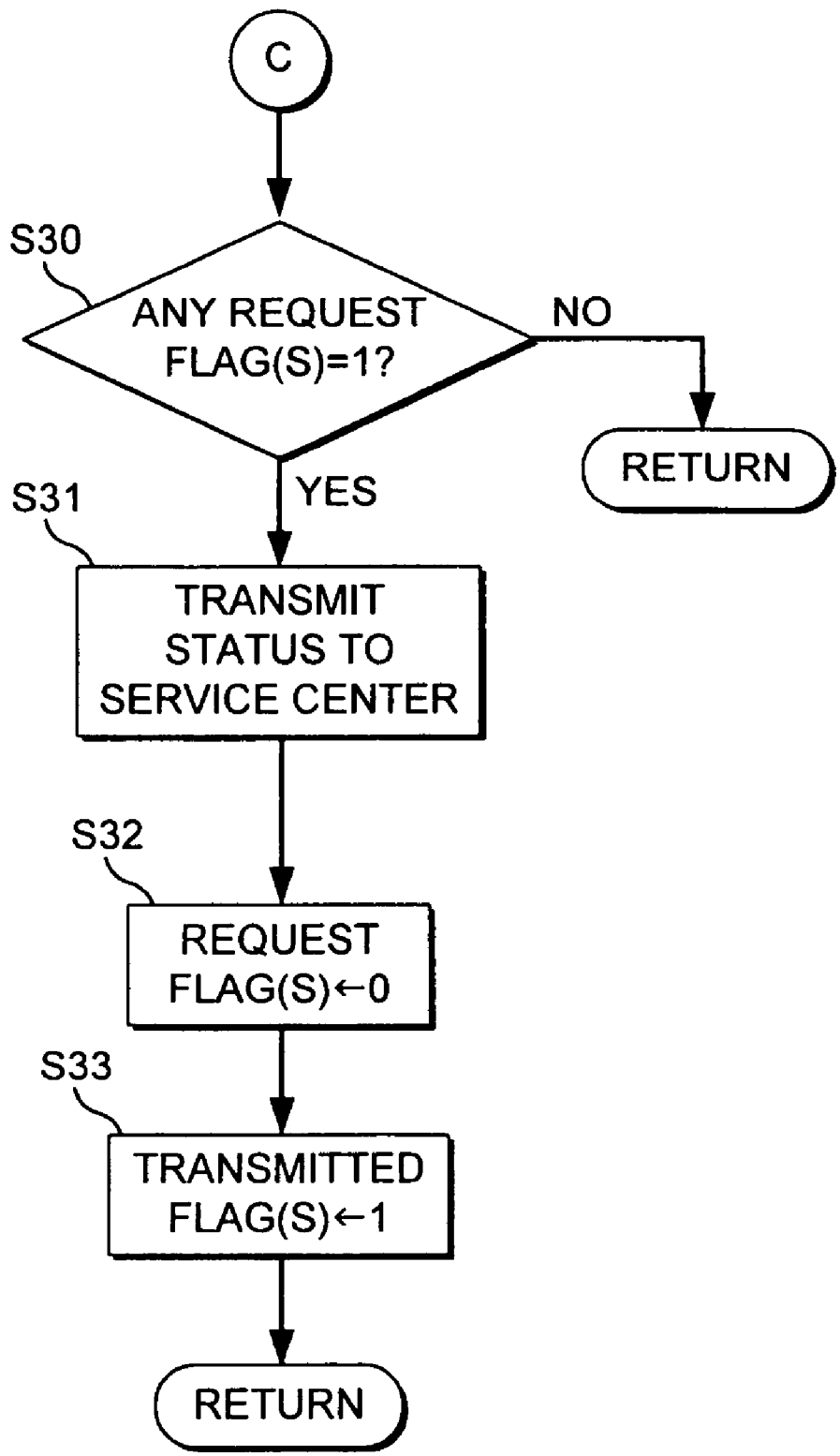

FIGS. 5a and 5b illustrate steps in a process constituting a preferred embodiment. The process starts at the so-labeled step and, when a sequence control unit of an image forming apparatus (e.g., control 304 in FIG. 3) receives a print request, as determined at step (S1), the following step (S2) checks whether or not a toner end condition has been detected. If the toner end condition has been detected, at step (S3) control unit 304 of FIG. 3 issues a control signal to provide a corresponding indication at unit 302. Then, at step (S4) the process checks whether a "Toner End Transmitted Flag" has been set. If the Flag has not been set, the control unit 304 sets at step (S5) a "Toner End Transmit Request Flag." If step (S4) determines that the toner end condition has already been transmitted to service center 102, and the toner end condition continues, step (S4) sets a "Toner End Transmitted Flag." If a Flag is set at step (S4) or (S5), sequence control unit 304 checks the paper end status.

If the toner end condition is not detected at (S2) and the "Toner End Transmitted Flag" is set, as determined at step (S6), control unit 304 resets the Flag at step (S7).

Next, control unit 304 checks at step (S8) if a paper end condition has been detected. If it has not been, and step (S9) determines that a "Paper End Transmitted Flag" has been set, the unit 304 resets the Flag at step (S10). If step (S8) determines that a paper end condition is detected, unit 304 issues at step (S11) a control signals to indicate the paper end on operation panel 302.

Then, unit 304 checks at step (S12) if a "Paper End Transmitted Flag" has been set. If it has been set, unit 304 checks at step (S20) if a full tank of used toner has been detected. If step (S12) determines that the "Paper End Transmitted Flag" has not been set, unit 304 checks at step (S13) if a "Counter Flag" has been set. If it has not been set, unit 304 sets it at step (S14) and at step (S15) starts a counting operation at counter 310. Analyzer 308 determines at step (S16) if counter 310 has counted a predetermined period of time, for example 2 hours and, if step (S16) determines that the period has elapsed, unit 304 sets "Paper End Transmit Request Flag" at step (S17) and resets the "Counter Flag" at step (S18) and resets counter 310 at step (S19).

Unit 304 checks whether the used toner tank is full at step (S20). If the full tank condition has been detected at step (S20), control unit 304 issues a control signal to indicate the tank full condition on operation panel 302 at step (S21). Then, unit 304 checks at step (S22) if a "Full Tank Transmitted Flag" is set. If the full tank condition has already been transmitted to the service center 102 and the full tank condition continues, the "Full Tank Transmitted Flag" is set at step (S22). If the Flag has not been set, control unit 304 sets a "Full Tank Request Flag" at step (S23). If the full tank condition is not detected at step (S20) and the "Full Tank Transmitted Flag" has been set, as determined at step (S24), at step (S25) control unit 304 resets the Flag. At step (S26) unit 304 checks if other errors have been detected, e.g., errors that should preclude a printing operation. If unit 304 detects such an error, at step (S27) it issues a control signal to indicate the error at operation panel 302 and to bar a printing operation. If unit 304 does not detect an error at step (S26), at step (S28) it issues a command to commence a printing operation and, when the printing operation has been completed, at step (S29) issues a print end command.

At step (S30) in FIG. 5b unit 304 checks if any Request Flags have been set. If such a Flag has been set, unit 304 reads status information from memory 312 and at step (S31) transmits the status information to service center 102. Unit 304 at step (S32) resets the transmitted Request Flag, and at step (S33) sets a Transmitted Flag of the status that has been transmitted. The "Return" step in FIGS. 5a and 5b means return to the "start" step.

Figure 6A:
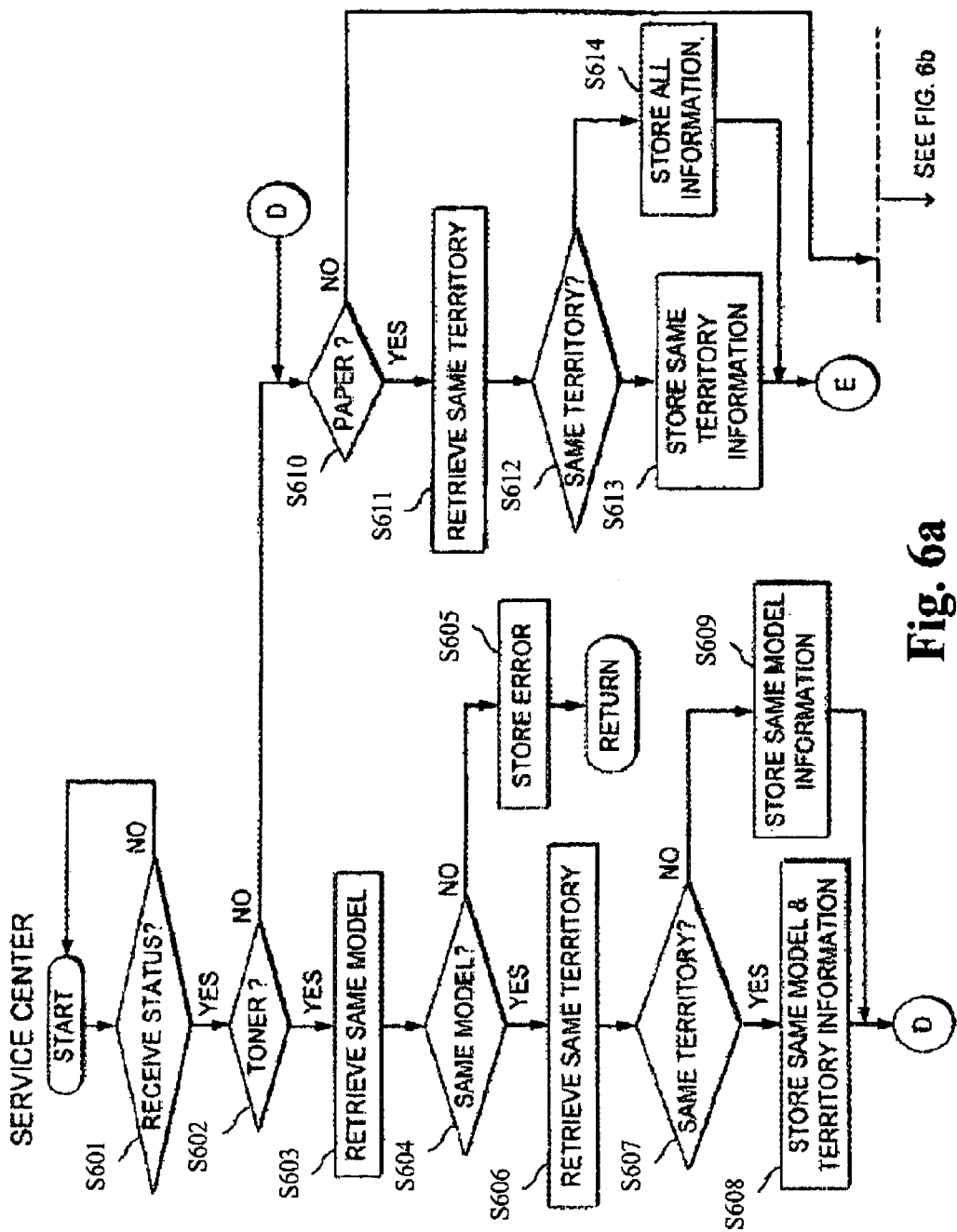
FIG. 6 illustrates an operation of a service center computer system related to receiving user status information, analyzing available information regarding users and suppliers, and transmitting analysis results to users.
Figure 6B:
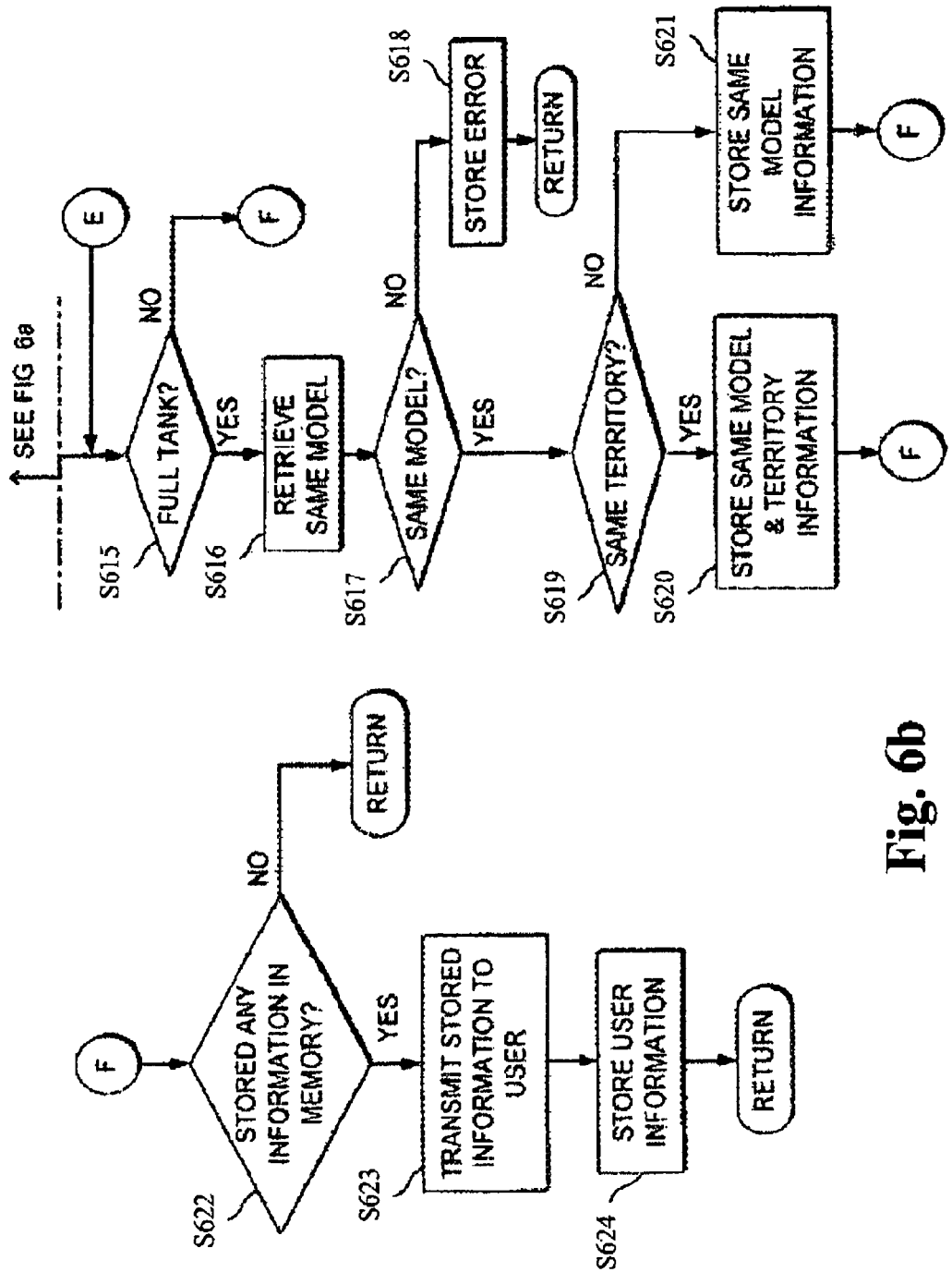

FIG. 6 illustrates an operation of service center system 136 related to receiving status information regarding image forming equipment at user side 100 and transmitting retailer/dealer information to the image forming equipment. Referring to FIG. 6, analyzer 408 of FIG. 4 checks at step (S601) if it has received status information from an image forming device such as a copier 110. If service center system 136 has received such status information (S601, YES), analyzer 408 checks what kind of status has been received. If analyzer 408 receives toner status, as determined at step S602 (YES), it interrogates database 406 to find the retailers or dealers who have toner bottles or toner cartridges that can be used for the image forming apparatus based on the copier's identity, e.g., model information that has been transmitted S603. If analyzer 408 does not find the appropriate retailers or dealers based on the model information (S604, NO), an error signal is stored in memory 410 (S605). If analyzer 408 finds one or more appropriate retailers or dealers based on the model information (S604, YES), at step S606 it interrogates database 406 to find retailers or dealers who can service the user's address among the retailers or dealers selected. If analyzer 408 finds appropriate retailers or dealers (S607, YES), it stores information regarding the selected retailers or dealers in memory 410. If analyzer 408 does not find retailers or dealers who can service a user's address (S607, NO), it stores information on all retailers or dealers that can service the user's image forming apparatus model in memory 410 (S609).

If the transmitted status is not toner information (S602, NO) or after storing the retailers/dealers information (S608 and S609), analyzer 408 checks if it has received paper end status (S610). If analyzer 408 has received paper end status (S610, YES), it interrogates database 406 to find retailers or dealers who can service the user's address (S611). If analyzer 408 finds retailers or dealers who can satisfy the territory condition (S612, YES), information regarding the found retailers or dealers is stored in memory 410 (S613). If analyzer 408 does not find retailers or dealers who can satisfy the territory condition (S612, NO), the information identifying all retailers or dealers stored in database 406 is stored in memory 410 (S614).

If the transmitted status is not paper end information (S610, NO) or after storing the retailers/dealers information (S613 & S614), analyzer 408 checks if it has received full tank status (S615). If analyzer 408 has received a full tank status (S615, YES), it interrogates database 406 to find retailers or dealers who have supplies of used toner tanks or toner cartridges that can be used for the user's image forming apparatus model (S616). If analyzer 408 does not find retailers or dealers who satisfy the model condition (S617, NO), it stores an error signal in memory 410 (S618). If analyzer 408 finds retailers or dealers who satisfy the model condition (S617, YES), analyzer 408 interrogates database 406 to find retailers or dealers who can service the user's address among the retailers or dealers that satisfy the model condition (S619). If analyzer 408 finds retailers or dealers who satisfy the territory condition (S619, YES), the information on the found retailers or dealers who satisfy the model and territory conditions is stored in memory 410 (S620). If analyzer 408 does not find retailers or dealers who satisfy the territory condition (S619, NO), the information on the retailers or dealers who satisfy the model condition is stored in memory 410 (S621).

Analyzer 408 checks if the retailer/dealer information is stored in memory 410 (S622). If the retailer/dealer information is stored in memory 410 (S622, YES), the retailer/dealer information is transmitted to the user's e-mail address that is involved in the transmitted status information (S623), or is transmitted to the user in some other way. The user information that can identify the user is stored in database 406 (S624).

According to the present embodiment, a user who receives the retailer/dealer information in this manner can conveniently identify a retailer or dealer who can provide the requisite supplies and can make an informed choice based on current needs and constraints. Referring to FIG. 7, when a user opens such e-mail, an ordering display is indicated on the user's personal computer. The user can input the quantity desired and can select a desired retailer/dealer by clicking the SELECT button. When the user clicks this button, selected retailer/dealer information is displayed. The user can order or cancel the selection by clicking the ORDER button or CAN- CEL button. If the user clicks the ORDER button, an ORDER number and the selected retailer/dealer information are displayed. The purchase order is transmitted to the selected retailer/dealer automatically and the supplies are delivered to the user.

Figure 8:
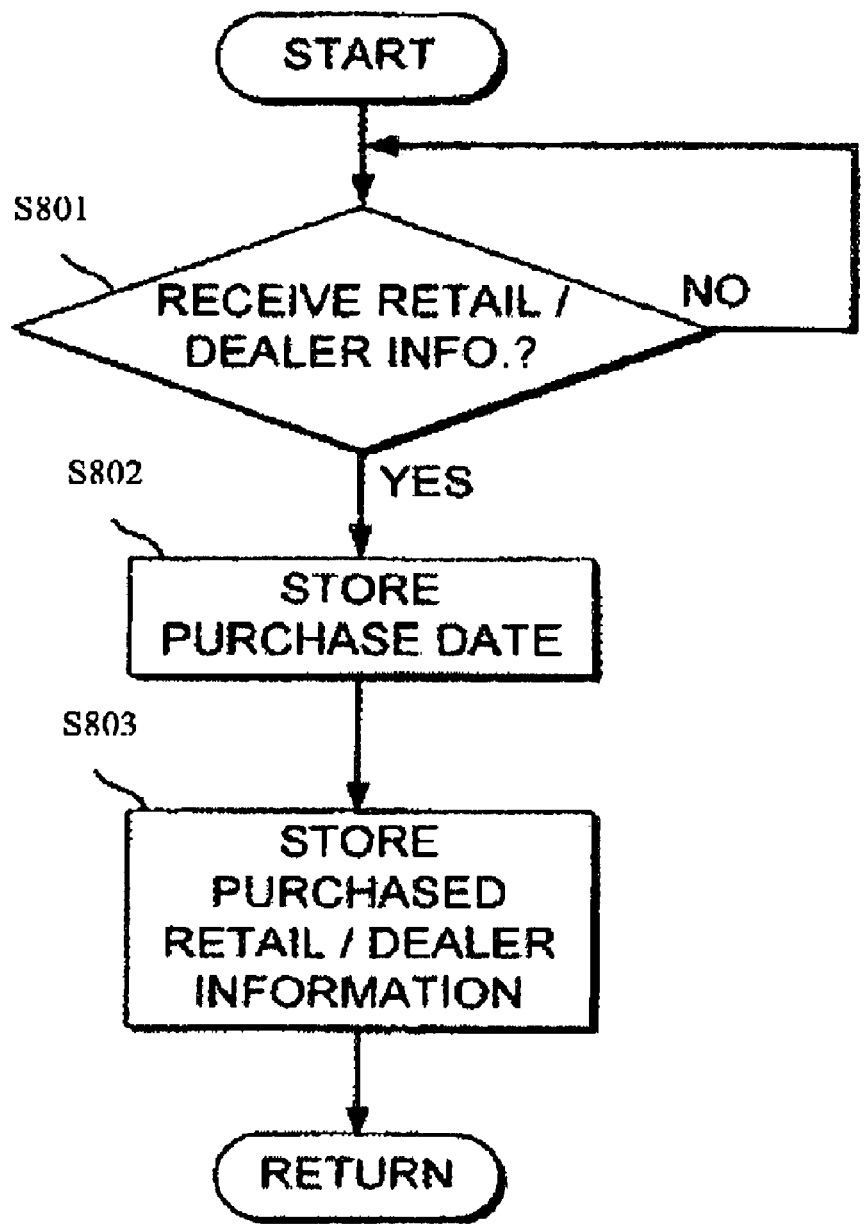
FIG. 8 is a flowchart illustrating steps in automatically transmitting information from a user side to the service center.

It is also possible to transmit a response that includes a selected retailer/dealer name, date when the user opens e-mail, and other information to the service center automatically. FIG. 8 shows an operation at the service center system 136. Referring to FIG. 8, if analyzer 408 receives the retailer/dealer information from a user (S801), the retailer/dealer information that is transmitted from the user (S803) and date (S802) when the system 102 receives the information are stored in the database 406.

While the specific example described in detail above is an illustrative embodiment, many variations and additions are contemplated within the scope of this patent specification. For example, status conditions other than, or in addition to, those illustrated above can be monitored and transmitted from the user side to the service station. They can be analyzed at the service station in a way different from, or in addition to, those disclosed above. The suppliers (dealers/retailers) can supply to the service center information different than or in addition to that disclosed above, to enable the service center to select appropriate potential suppliers. The communications between the user side, the service center and the dealers/retailers can be over different channels and in different formats. Use can be made of home page 148 and its database 150 of FIG. 1 for some or all of the information flow and analysis of the types discussed above.

The invention claimed is:

1. A system for providing a user with supplies information for an image forming equipment, comprising:
    an image forming equipment at a user side which includes a controller configured to provide status information for the image forming equipment through a network, the status information including (a) model information indicative of a model of the image forming equipment, (b) supplies usage information indicative of supplies usage status of the image forming equipment, and (c) an e-mail address; and
    a supplies center computer connected through the network to the image forming equipment, and including a control unit configured through one or more programs of instructions executing on the control unit to include (i) a receiver configured to receive the status information of the image forming equipment, (ii) an analyzer configured to analyze the status information of the image forming equipment and find appropriate model information and retailer/dealer information in a database of suppliers information, and (iii) an email transmitter configured to send email to the email address included in the status information from the user side, the email including order information indicative of a plurality of choices for obtaining available supplies and for a user to select quantity and retailer/dealer information for the analyzed image forming equipment,
    wherein said receiver of said supplies center computer is further configured to receive from the user side a final determination of supplies to be ordered and purchased for the image forming equipment, based on selection from the order information included in the e-mail.

2. The system of claim 1, wherein said analyzer analyzes the status information of the image forming equipment to determine supplies requiring ordering, and interrogates said database of suppliers information to obtain contact information of a plurality of retailers/dealers of said supplies requiring ordering.

3. The system of claim 2, wherein said analyzer utilizes said model information indicative of the model of the image forming equipment, for interrogating said database of suppliers information to obtain said contact information of said plurality of retailers/dealers.

4. The system of claim 3, wherein said email transmitter sends said email including said contact information of said plurality of retailers/dealers of said supplies requiring ordering, to said email address.

5. The system of claim 1, wherein said order information in the email enables the user to specify quantity, select a retailer/dealer and place an order automatically transmitted to the selected retailer/dealer.

6. A system for providing a user with supplies information for an image forming equipment, comprising:
    a user side control unit configured to provide status information for image forming equipment, at the user side, said status information including (a) model information indicative of a model of the image forming equipment, (b) supplies usage information indicative of supplies usage status of the image forming equipment, and (c) an e-mail address; and
    a service center control unit connected through a network to said user side control unit and configured through one or more programs of instructions executing on the service center control unit to include
        (i) a receiver configured to receive the status information of the image forming equipment;
        (ii) an analyzer configured to analyze the status information of the image forming equipment and find appropriate model information and retailer/dealer information in a database of suppliers information; and
        (iii) an e-mail transmitter configured to send email to the email address included in the status information from the user side, the email including order information indicative of a plurality of choices for obtaining available supplies and for a user to select quantity and retailer/dealer information for the analyzed image forming equipment,
    wherein said receiver of said service center control unit is further configured to receive from the user side a final determination of supplies to be ordered and purchased for the image forming equipment, based on selection from the order information included in the e-mail.

7. The system of claim 6, wherein said analyzer analyzes the status information of the image forming equipment to determine supplies requiring ordering, and interrogates said database of suppliers information to obtain contact information of a plurality of retailers/dealers of said supplies requiring ordering.

8. The system of claim 7, wherein said analyzer utilizes said model information indicative of the model of the image forming equipment, for interrogating said database of suppliers information to obtain said contact information of said plurality of retailers/dealers.

9. The system of claim 8, wherein said email transmitter sends said email including said contact information of said plurality of retailers/dealers, to said email address.

10. The system of claim 6, wherein said order information in the email includes user interface provisions for the user to specify quantity, select a retailer/dealer and place an order automatically transmitted to the selected retailer/dealer.

11. A method for providing a user with supplies information for an image forming equipment, comprising:

(a) receiving, at a supplies center control unit and through a network, status information for image forming equipment at a user side, said status information including (i) model information indicative of a model of the image forming equipment, (ii) supplies usage information indicative of supplies usage status of the image forming equipment, and (iii) an e-mail address; and (b) analyzing, automatically through the supplies center control unit, the status information of the image forming equipment to find appropriate model information and retailer/dealer information in a database of suppliers information; and (c) sending from the supplies center control unit an email to the email address included in the status information from the user side, the email including order information indicative of a plurality of choices for obtaining available supplies and for a user to select quantity and retailer/dealer information for the analyzed image forming equipment; and (d) receiving by the supplies center control unit from the user side a final determination of supplies to be ordered and purchased for the image forming equipment, based on selection from the order information included in the e-mail.

12. The method of claim 11, further comprising:
determining supplies requiring ordering through said analyzing in (b); and
interrogating said database of suppliers information to obtain contact information of a plurality of retailers/dealers of said supplies requiring ordering.

13. The method of claim 12, further comprising:
utilizing said model information indicative of the model of the image forming equipment, to interrogate said database of suppliers information, to obtain said contact information of said plurality of retailers/dealers.

14. The method of claim 13, further comprising:
sending said email including said contact information of said plurality of retailers/dealers of said supplies requiring ordering, to said email address.

15. The method of claim 11, further comprising:
inserting user interface provisions in said order information in the email for the user to specify quantity, select a retailer/dealer and place an order automatically transmitted to the selected retailer/dealer.

* * * * *